May 18, 1937.   R. E. THOMPSON   2,080,750
METHOD OF MAKING BEARINGS
Filed March 2, 1934
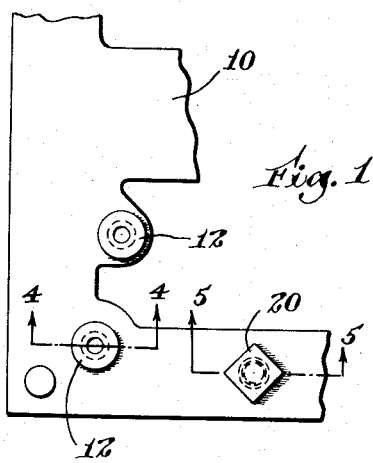
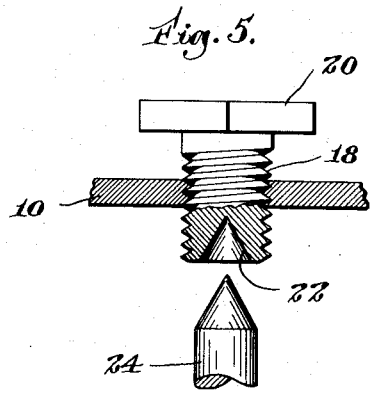
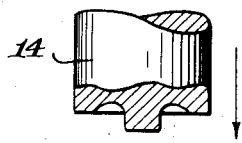
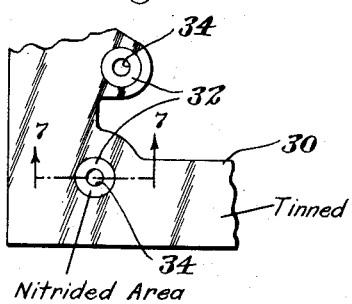
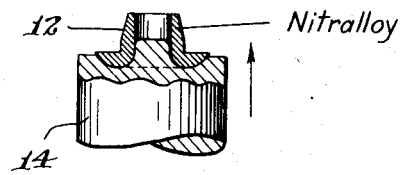
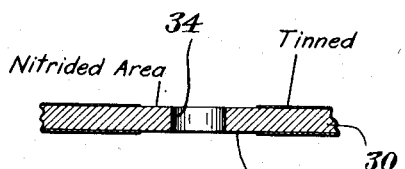
Inventor
Ralph E. Thompson
by Kenway & Witter
Attorneys Patented May 18, 1937

2,080,750

UNITED STATES PATENT OFFICE 2,080,750

METHOD OF MAKING BEARINGS

Ralph E. Thompson, Brookline, Mass.

Application March 2, 1934, Serial No. 713,641

4 Claims. (Cl. 29—149.5)

This invention consists in a new and improved method of making small bearings, particularly bearings adapted for use in the movements for clocks or watches. In one aspect it comprises a novel method of forming hardened bearings in clock plates for the rotary and oscillatory shafts of the clock movement. The invention includes within its scope the improved bearing for clock movements herein shown as produced by the method of my invention but this subject matter is not herein claimed. It is customary to form the plates of a clock movement by stamping from sheet brass or other unhardened sheet metal and to form in these plates bearings for the shafts of the movement. Such bearings are subject to serious wear which impairs the accuracy of the timepiece and definitely limits its life. Jewel bearings are employed in more expensive movements but these very materially increase the cost of the movement, besides requiring the services of skilled watchmakers.

I have discovered that a bearing having the hardness of a jewel bearing may be provided at little cost under commercial conditions of manufacture by utilizing therefor a nitridable ferrous alloy which may be hardened by a process of nitriding, that is to say, by introducing nitrogen into or causing it to combine with the alloy. One suitable alloy of this type is known under the trade name Nitralloy. When this metal is exposed to ammonia fumes under conditions of high temperature, it becomes nitrided upon its exposed surfaces and is thereby rendered extremely hard. The nitriding process, however, may be successfully carried out at temperatures which in no way impair the clock plate in which the bearing is to be formed. From one standpoint, therefore, my invention consists in a method of making bearings for the movements of clocks and the like, consisting in the steps of locating a defined area of exposed nitridable alloy at the desired point in the clock plate and then hardening such limited area by nitriding. If desired, the nitrided area in the clock plate may be trued by grinding before nitriding and in this way an extremely fine hard bearing is provided which greatly benefits the life and performance of the timepiece.

The manner in which the nitrided area is rendered available is of secondary importance only and I have herein shown alternative ways of accomplishing the desired results. Eyelets or tubular rivets of nitralloy may be inserted and clenched at the proper points in the clock plate and then hardened by nitriding without any objectionable results to the clock plate. Alternatively, a nitralloy stud may be threaded into an opening in the clock plate and hardened after it is in place, or the clock plate may be formed of sheet nitralloy plated or tinned for protection except in the defined area which it is desired to harden for bearing purposes. In carrying out my invention it is necessary only to produce accurately in an area of nitridable material the desired configuration of the bearing and then to harden the same by nitriding, whereupon there results a bearing having the hardness and wearing qualities long desired in all clock movements but hitherto available only in such movements as warrant the expense of jewel bearings.

These and other features of the invention will be best understood and appreciated from the following description of several specific embodiments thereof, selected for purposes of illustration and shown in the accompanying drawing, in which Fig. 1 is a fragmentary plan view of a clock plate with several bearings therein;

Fig. 2 is a view in elevation, partly in section and on an enlarged scale, illustrating the operation of setting a nitralloy eyelet in a clock plate;

Fig. 3 is a similar view illustrating the operation of grinding the clenched nitralloy eyelet;

Fig. 4 is a sectional view of the finished bearing produced by the steps of Figs. 2 and 3;

Fig. 5 is a view in elevation, partly in section, of a portion of the clock plate having a bearing stud inserted therein; and Figs. 6 and 7 are respectively plan and sectional views of a nitralloy clock plate having bearing openings therein.

In Fig. 1 is shown a portion of a clock plate 10 which, with a similar plate, goes to make up the frame of the clock movement and between which are journaled the rotary or oscillatory shafts of the movement. Such clock plates are usually punched from sheet brass and bolted together in spaced relation. The plate shown in Fig. 1 may be similar to the plate of any commercial movement except that the diameter of the bearing holes, instead of being designed to receive the shouldered end of the shafts, are of sufficient diameter to receive a nitralloy eyelet 12. This may be inserted by cooperating clenching tools 14 which set the eyelet flange firmly against one surface of the plate 10 and clench the end of the eyelet barrel upon the other face of the plate. It will be understood that such eyelets may be rapidly and accurately inserted and clenched in the clock plates before the latter are assembled.

While in many cases the shape of the clenched eyelet will be accurate on account of the action of the clenching dies, I prefer in some instances to true the opening of the eyelet and flatten the face against which is to bear the shouldered end of the shaft. Accordingly, as suggested in Fig. 3, a specially shaped and shouldered grinding cylinder 16 is brought into momentary engagement with the clenched eyelet. The reduced center portion of the grinding tool passes through the bore of the clenched eyelet, truing its surface, and the flat end surface of the tool engages the curved flanged face of the eyelet, flattening it and bringing it into parallelism with the plane of the clock plate 10.

Having completed the grinding operation, if this step is required, the clock plate with the clenched and trued nitralloy eyelet 12 therein is heated in a furnace in the presence of ammonia gas at a temperature sufficiently high to ensure carrying out the nitriding operation. In some cases a temperature of 930 to 950° F. will be found suitable, but it will be apparent that the assembled plate may be treated at a somewhat higher temperature without in any way being detrimentally affected. The result of a higher temperature treatment is a deeper penetration of the nitriding effect and a somewhat softer resulting material than is produced at lower temperatures. The nitriding operation may be satisfactorily carried out at a temperature of 950° F. in an interval of two hours or somewhat less, while at a temperature of 1150° F. the operation may be completed in a much shorter interval. The temperature and time used for nitriding the eyelet may be considered as determining to some extent the surface characteristics of the bearing. For example, a bearing nitrided for two hours at 950° F. will be slightly, but only very slightly, softer than if the nitriding operation is carried out at 1150° F. In any case, an extreme degree of hardness is imparted to the bearing, so much so that wear is practically eliminated. The complete and nitrided bearing is shown in Fig. 4 on a somewhat enlarged scale. The clock plate 10 in Fig. 1 is represented as having such bearings for the rocker shaft carrying the anchor of the escapement and for the shaft of the intermittently rotating escapement wheel.

My invention may be also embodied in the stud type of bearing shown in Fig. 5, customarily used to journal the shaft of the balance wheel of the movement, which is cone pointed at its ends. For this bearing, the opening in the plate 10 is threaded to receive the threaded shank of the stud 18. The stud is provided with a square head 20 and in the end of its shank is provided a cone-shaped recess 22. This corresponds in shape to the end of the balance wheel shaft 24, as shown in Fig. 5. The stud 18 is of nitralloy and after it has been inserted in the clock plate its inner end, in which the bearing recess is formed, is hardened by nitriding in the presence of ammonia gas, as already explained.

In the embodiment of my invention shown in Figs. 6 and 7, the entire clock plate 30 is formed of nitralloy and the surfaces of the plate may be tinned or plated so as to render them impervious to the nitriding action of ammonia gas. In this instance, the tinned or plated covering layer is removed to expose a circular area 32 concentric with the bearing opening 34. Consequently, when the plate thus prepared is heated in a furnace in the presence of ammonia gas, the walls of the opening 34 and the surface areas 32 surrounding the same are nitrided and hardened while the body of the plate remains unaffected. If desired, the bearing holes and the surface of the plate adjacent thereto may be trued by grinding and this is preferably done before the nitriding operation since the nitrided material is confined largely to the exposed surfaces of the nitralloy, leaving little material available to be removed by grinding.

The material employed in producing bearings in accordance with my invention may be any nitridable ferrous alloy having the characteristics best suited for the particular type of bearing required. Nitralloy of either of the following analyses has been found satisfactory for the manufacture of such bearings:

| Element | Analysis A | Analysis B |
|---|---|---|
| Carbon | 0.36 | 0.23 |
| Manganese | .51 | .51 |
| Silicon | .27 | .20 |
| Aluminum | 1.23 | 1.24 |
| Chromium | 1.49 | 1.58 |
| Sulphur | .010 | .011 |
| Phosphorous | .013 | .011 |
| Molybdenum | .18 | .20 |

Nitralloy of either of the above analyses is of such character that it may be easily and conveniently machined in producing a clock plate, and in its unnitrided condition it is entirely suitable for such use. If nitrided throughout its entire area, it would, however, be too hard and brittle to be satisfactory and it is, accordingly, advantageous to limit the nitrided areas therein approximately to the size required for the bearing. Nitralloy in sheet form may be readily tinned upon its surfaces or plated so that the body of the clock plate is protected against the nitriding action of the ammonia gas and only the limited exposed areas become nitrided. The clock plate, therefore, comprises a main body of relatively soft sheet nitralloy having isolated defined areas of exceeding hardness. Similarly, it will be understood that an eyelet or tubular rivet of nitralloy may be readily clenched or otherwise worked, although the hard and brittle characteristics of the nitrided material obviate the possibility of anything except grinding or polishing. Such treatment is not usually necessary after the nitriding operation but, of course, may be practiced within the scope of my invention.

I have specifically referred herein to movements for clocks and watches but contemplate the application of my invention to movements for time pieces and time registers in general, as well as to other recording or indicating instruments employing rotating parts.

Having thus described my invention, what I claim as new and desire to secure by Letters Patent is:

1. The method of making hardened bearings for clock movements, which consists in inserting in a sheet brass clock plate a nitralloy eyelet, clenching the end of the eyelet barrel upon the outer surface of the plate and thus providing a tubular bearing surface of nitralloy extending through the clock plate, and then nitriding the bearing surface so provided.

2. The method of making hardened bearings for clock movements, which consists in shaping a clock plate of nitridable alloy in sheet form, protecting both surfaces of the clock plate by a coating impervious to ammonia gas, drilling bearing holes in the plate, exposing defined areas of the plate adjacent to such bearing holes, and then hardening the areas thus exposed and the walls of the bearing holes by nitriding.

3. A method of making hardened bearings for clock movements or the like, which consists in forming a plate of thin sheet nitridable alloy having accurately spaced bearing holes therein, protecting the surfaces of said plate against the action of ammonia gas except in isolated areas including the bearing holes, and then nitriding the unprotected areas of the plate, including the annular walls of said bearing holes, by heating the whole plate in the presence of ammonia gas.

4. The method of making hardened bearings for clock movements or the like, which consists in locating in a thin clock plate definite areas of unprotected nitridable ferrous alloy separated by unnitridable areas, forming bearings in the unprotected areas, and then hardening by nitriding the bearing areas while leaving the remainder of the plate in unhardened condition.

RALPH E. THOMPSON.